United States Patent [19]

Ito et al.

[11] 4,252,698
[45] Feb. 24, 1981

[54] ANTI-YELLOWING COMPOSITION

[75] Inventors: Michio Ito, Shiraoka; Yoshimitsu Numajiri, Showa; Seiji Kimura, Washinomiya; Tetsuo Sekiguchi, Hasuda, all of Japan

[73] Assignee: Argus Chemical Corporation, Brooklyn, N.Y.

[21] Appl. No.: 30,731

[22] Filed: Apr. 17, 1979

[30] Foreign Application Priority Data

Apr. 17, 1978 [JP] Japan .................. 53-45018

[51] Int. Cl.³ .................. C08K 5/13; C08K 5/41; C08K 5/07; C08K 3/10
[52] U.S. Cl. .................. 260/18 EP; 252/400 R; 252/404; 252/406; 252/407; 260/45.75 R; 260/45.75 J; 260/45.75 W; 260/45.75 Z
[58] Field of Search .................. 252/400 R, 404, 406, 252/407; 260/45.75 R, 45.75 J, 45.75 W, 45.75 Z, 18 EP

[56] References Cited

U.S. PATENT DOCUMENTS

| 3,245,980 | 4/1966 | Stright | 252/400 R |
| 3,692,738 | 9/1972 | Mathis et al. | 252/400 R |
| 4,165,291 | 8/1979 | Gragson | 252/400 R |

Primary Examiner—Benjamin R. Padgett
Assistant Examiner—Irwin Gluck
Attorney, Agent, or Firm—Otto S. Kauder

[57] ABSTRACT

An anti-yellowing additive is provided for environmentally acceptable stabilized vinyl chloride polymer compositions from which arsenic, beryllium, cadmium, lead, mercury, and thallium are substantially excluded, comprising at least one overbased sulfonate or phenolate compound of lithium, sodium, potassium, magnesium, calcium, strontium, barium, zinc, titanium, aluminum, zirconium, or tin, and a 1,3-diketone compound having 5 to 30 carbon atoms, which is a cyclic or open-chain 1,3-diketone or a lithium, sodium, potassium, magnesium, calcium, strontium, barium, zinc, aluminum, tin or zirconium salt thereof.

17 Claims, No Drawings

ANTI-YELLOWING COMPOSITION

BACKGROUND OF THE INVENTION

This invention relates to environmentally acceptable stabilized vinyl chloride polymer compositions from which environmentally objectionable metals such as arsenic, cadmium, beryllium, lead, mercury, and thallium are substantially excluded, and to an anti-yellowing additive so such environmentally acceptable stabilized vinyl chloride polymer compositions to minimize undesirable yellowing during the process of fabricating and shaping such compositions into useful articles.

There is a voluminous literature on the stabilization of vinyl chloride polymers. Patent disclosures of materials stated to be useful in minimizing deterioration of vinyl chloride polymers on heating number well over one thousand. Among the more important heat stabilizers in commercial use are mild alkalis such as sodium carbonate, disodium phosphate, and sodium and potassium salts of partially esterified phosphoric acids; carboxylates and phenolates of zinc, cadmium, and the alkaline earth metals; inorganic and organic lead salts; organotin carboxylates. as disclosed by Quattlebaum in U.S. Pat. No. 2,307,157; organotin mercaptides as disclosed by Leistner in U.S. Pat. Nos. 2,641,588 and 2,641,598; various metal-free organic compounds such as the polyols, e.g. mannitol, sorbitol, glycerol, pentaerythritol, organic phosphites, 1,2-epoxides, e.g., soybean oil peroxide, isooctyl epoxy-stearate, and diglycidyl ether of 2,2-bis(p-hydroxyphenyl) propane, and nitrogen compounds, e.g., phenylurea, N,N'-diphenylthiourea, and 2-phenylindole. For detailed discussion of heat stabilizers for vinyl halide resins, reference may be made to the articles, L. I. Nass, in "Encyclopedia of Polymer Science and Technology" (N. Bikales, ed.) Vol. 12, pages 737 to 768 (1970); N. L. Perry "Barium-Cadmium Stabilization of Polyvinyl Chloride," *Rubber Age* 85, 449–452 (June, 1959), and by H. Verity-Smith, *British Plastics* 27, 176–179, 213–217, 307–311 (1954); the brochure by the same author *The Development of the Organotin Stabilizer* (Tin Research Institute, 1959) and the book *La Stabilisation des Chlorures de Polyvinyle* by F. Chevassus (Amphora, Paris, 1957).

Preponderant in quantity used for many years have been the lead salts, such as tribasic lead sulfate, normal and dibasic lead stearate, dibasic lead phthalate, dibasic leadphosphite, and basic lead carbonates and silicates. Vinyl chloride polymer compositions stabilized with lead compounds are recognized as outstanding in electrical properties and good in color protection during long extended processing at high temperatures, while poor in clarity owing to the insolubility and pigmenting properties of the lead compounds. Next in quantity used have been the organic salt mixtures containing cadmium, as disclosed for example by W. Leistner, in U.S. Pat. No. 2,716,092 of Aug. 23, 1955, G. Mack in U.S. Pat. No. 2,935,491, of May 23, 1960 and J. Scullin in U.S. Pat. No. 3,390,112 of June 25, 1968. Cadmium containing stabilizers have provided excellent heat stability combined with outstanding clarity and resistance to weathering exposure. With the steady increase in usage of vinyl chloride polymer compositions and coincidentally increased concern about the accumulation of toxic materials in the human environment, there has developed a need to replace the lead and cadmium based stabilizers by environmentally more acceptable and no less effective stabilizers. The very favorable properties of the lead and cadmium containing stabilizers, however, have made it difficult to find equivalent replacements. In particular, vinyl chloride polymer compositions stabilized with materials other than lead and cadmium have been subject to objectionable yellowing even where the time to severe heat failure was relatively satisfactory.

J. Darby in U.S. Pat. No. 2,669,548 of Feb. 16, 1954 disclosed halogen-containing resin compositions having improved stability containing a mixture of a zinc salt and a calcium chelate derivative of a 1,3-dicarbonylic compound capable of keto-enol tautomerism. Zinc salts can be zinc salts of organic acids and zinc salts of weak inorganic acids, for example zinc acetate, zinc propionate, zinc octanoate, zinc ricinoleate stearate, and zinc salts of carbonic, silicic, and boric acids. Calcium chelates can be derivatives of betadiketones, beta-ketoacids, and the esters of betaketoacids, for example the calcium chelates of ethyl acetoacetate, phenyl acetoacetate, acetoacetic acid, acetylacetone, benzoylacetone, and diacetylacetone.

F. Ebel in U.S. Pat. No. 3,001,970 of Sept. 26, 1961 disclosed preventing the discoloration of polymers of vinylidene chloride in light by adding a small amount of a dibenzoylmethane of the general formula:

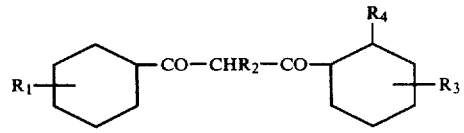

in which $R_1$ represents hydrogen or a hydroxyl radical, and $R_3$, $R_1$ and $R_4$ represent hydrogen or hydrophobic radicals. Such hydrophobic radicals are for example alkyl, cycloalkyl, aryl, aralkyl and halogen radicals.

British Pat. No. 1,141,971 of May 23, 1967 to W. R. Grace & Co. disclosed zinc complexes of beta-dicarbonyl compounds used as stabilizing additives for chlorine-containing polymers in general, and polyvinyl chloride in particular. The zinc complexes possess the general formula:

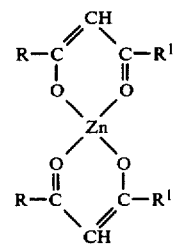

wherein R and R' are the same or different and are each hydrogen or an alkyl, alkoxy, phenyl or phenoxy group. Preferably when R represents an alkyl or alkoxy group, it contains 1 to 20 carbon atoms.

W. R. Pryer in U.S. Pat. No. 3,446,765 of May 27, 1969 disclosed that where unplasticized polyvinyl chloride compositions containing finely divided precipitated calcium carbonate discolor on exposure to light, one can prevent the discoloration by incorporating in the composition small amounts of basic compounds of metals, for example oxides of magnesium, zinc, and aluminum, particularly magnesium oxide. The only stabilizer present in a vinyl chloride polymer composition in which the favorable effect of the basic compound is demonstrated by Pryer is a barium/cadmium stabilizer.

L. Weisfeld in U.S. Pat. No. 3,493,536 of Feb. 3, 1970 disclosed that diaroylmethane compounds of the general formula $C_6H_5CO-CHR-COC_6H_5$ wherein R is hydrogen or a monovalent hydrocarbon radical provide stabilizing action against the sensitizing effect of bismuth or antimony compounds on chlorine-containing materials.

C. E. Parks in British Pat. No. 1,229,521 of Apr. 21, 1971 disclosed a synergistic combination of tin mercaptide stabilizers with calcium oxide, calcium phenoxide, calcium hydroxide and calcium alcoholates, whereby smaller amounts of tin mercaptide may be used with the synergist to obtain the same degree of heat stability as with much larger amounts of the tin mercaptide. In British Pat. No. 1,229,522 Parks disclosed a similar combination of tin mercaptide stabilizers with magnesium oxide or hydroxide, and noted that with other stabilizer systems, for example calcium zinc organic acid salts, the addition of magnesium oxide contributed to decreased heat stability when used in combination with the calcium-zinc stabilizer.

Similarly, T. Jennings in U.S. Pat. No. 3,764,571 of Oct. 9, 1973 disclosed a stabilizer combination for vinyl chloride polymers of a sulfur containing organotin compound having the structural feature

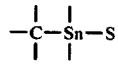

with a metal carboxylic acid salt having the formula (RCXX)nM in which R is a hydrocarbon or substituted hydrocarbon radical, X is oxygen or sulfur, n is an integral number from 1-2 and M is an alkali or alkaline earth metal, and a basic compound which can be an alkali or alkaline earth (i.e. Group I and IIa) metal oxide, hydroxide, carbonate, bicarbonate, thiocarbonate, sulfide, bisulfide, sulfite or bisulfite.

The basic compound ingredient of Jennings' combination can also be an organic overbased complex of an alkali or alkaline earth metal base such as an oxide, hydroxide, carbonate, thiocarbonate, sulfide, bisulfide, sulfite, or bisulfite.

L. Brecker in U.S. Pat. No. 3,787,357 of Jan. 22, 1974 disclosed stabilizer compositions comprising a monoalkyltin mercaptocarboxylic acid ester compound, a dialkyltin compound having tetravalent tin linked to sulfur and through carbon to two alkyl groups, barium carbonate, and an organic salt acting as a liquifier for the carbonate, in particular ranges of proportions of these ingredients. Brecker's organic salts used to liquify the barium carbonate are barium phenolates and barium and calcium sulfonates. In U.S. Pat. No. 3,803,083 of Apr. 9, 1974, Brecker disclosed stabilizer compositions comprising an organotin mercaptocarboxylic acid ester, a non-toxic alkaline earth metal carbonate, and, as an organic salt acting as liquifier for the carbonate an aromatic acid containing sulfur and having at least 20 carbon atoms, preferably a calcium or magnesium sulfonate or sulfurized phenate.

Liquid barium carbonate-barium alkyl phenate compositions have been used as barium components of barium-cadmium stabilizers as disclosed by W. LeSuer in U.S. Pat. No. 3,194,823 of July 13, 1965.

M. Crochemore in U.S. Pat. No. 4,102,839 of July 25, 1978 disclosed the possibility of preventing the thermal breakdown of vinyl chloride polymers by adding 0.1 to 5% by weight of the polymer of one or more carboxylic acid salts of 2-valent metals such as calcium, barium, zinc, lead, or cadmium and 0.05 to 5% by weight of an organic compound having the formula: $R_1-CO-CH-R_2-CO-R_3$ in which $R_1$ and $R_3$, which can be alike or different, represent linear or branched alkyl or alkenyl groups with up to 30 carbon atoms, aralkyl groups with 7 to 36 carbon atoms, or aryl or cycloaliphatic groups with less than 14 carbon atoms, optionally substituted with halogen atoms, aryl or cycloaliphatic groups, methyl or ethyl groups; aliphatic $R_1$ and $R_3$ groups can also be modified by the presence of one or more —O—,

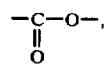

or —CO— groups, or taken together represent a 2-valent alkylene group having two to five carbon atoms; also, one of the groups $R_1$ and $R_3$ can be a hydrogen atom; $R_2$ is a hydrogen atom, an alkyl or alkenyl group with up to 30 carbon atoms which can include —O—,

and —CO— groups, a group $R-CO-R_4$ where $R_4$ is an alkyl group with 1 to 30 carbon atoms or an aryl group when $R_1$ and $R_3$ are non-aromatic, or a group having the formula $-R_5-CH(-CO-R_1)-CO-R_3$ in which $R_5$ is an alkylene group with 1 to 6 carbon atoms. The combination of carboxylic acid metal salt and 1,3-dicarbonyl compound is stated to be superior to an equimolar quantity of 1,3-dicarbonyl compound metal chelate.

M. Gay in U.S. Pat. Nos. 4,123,399 and 4,123,400 of Oct. 31, 1978 has disclosed vinyl chloride compositions containing relative to the weight of the polymer from 0.1 to 5% of one of the four pairs of organic salts of the metals Ca-Zn, Ca-Cd, Ba-Zn, or Ba-Cd, the organic salts being salts of saturated or unsaturated, substituted or unsubstituted aliphatic carboxylic acids, or aromatic carboxylic acids, together with 0.05 to 1% by weight of a polyol, and 0.05 to 5 parts of an organic compound having the formula $R_1-CO-CHR_2-CO-R_3$ in which $R_1$, $R_2$, and $R_3$ are defined as by Crochemore, above.

In U.S. Pat. No. 3,346,536 of Oct. 10, 1967 there is disclosed a stabilizer combination of a ketoacetic acid compound, which can be an ester or an acid anhydride dimer thereof, with a metal salt of an organic acid. The ketoacetic acid esters have the formula

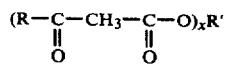

wherein R is an inert organic group having from one to about thirty carbon atoms, R' is an inert organic radical having from one to about thirty carbon atoms, and x is a number from one to ten. The ester molecule has a total of at least eight carbon atoms.

The ketoacetic acid anhydride dimers have the formula

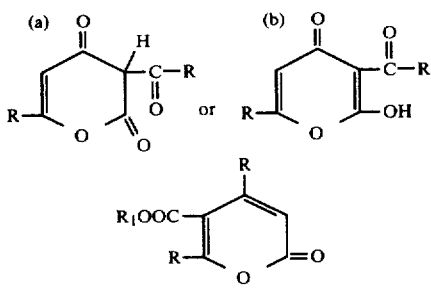

R is again as above and $R_1$ is hydrogen or R'.

SUMMARY OF THE INVENTION

In accordance with this invention, environmentally acceptable stabilized vinyl chloride polymer compositions are prepared from which environmentally objectionable metals such as arsenic, cadmium, lead, mercury, and thallium are excluded. The exclusion of the objectionable metals is accomplished by avoiding the use of previously irreplaceable cadmium and lead based stabilizers and holding the level of unavoidable incidental contamination by objectionable metals to the lowest practicable amount, usually governed by the natural impurity levels found in metal compound starting materials used in the preparation of vinyl chloride polymer stabilizers based on environmentally acceptable metals such as zinc, tin, calcium, barium, lithium, sodium, potassium, aluminum, strontium, zirconium and magnesium. Thus the use of a typical lead based stabilizer formulation in polyvinyl chloride plastic results in a lead content of 25,000 to 50,000 mg lead per kilogram of plastic while the use of typical cadmium containing stabilizer formulation contributes 200 to 2000 mg cadmium per kilogram of plastic. The use, on the other hand, of stabilizers made from available commercial grades of the environmentally acceptable metals without addition of compounds of the listed objectionable metals contributes per kilogram of plastic 10 mg or less of arsenic, beryllium, cadmium, lead, mercury, and thallium combined. Accordingly, environmentally acceptable stabilized vinyl chloride polymer compositions are defined as stabilized vinyl chloride polymers compositions containing not more than 10 mg of arsenic, beryllium, cadmium, lead, mercury, and thallium combined per kilogram of vinyl chloride polymer.

Also in accordance with this invention, an anti-yellowing additive is added to prevent objectionable yellowing of environmentally acceptable stabilized vinyl chloride polymer compositions as above defined. The quantity of anti-yellowing additive needed is modest, ranging from 0.02 part by weight to 15 parts by weight per 100 parts by weight of vinyl chloride polymer. The anti-yellowing additive comprises in combination (A) at least one overbased organic sulfonate of phenolate compound of an eventually acceptable alkali or alkaline earth metal, i.e. lithium, sodium, potassium, magnesium, calcium, strontium and barium; and (B) for each part by weight of overbased metal compound 0.01 to 1 part by weight of a cyclic or open-chain 1,3-diketone compound having 5 to 30 carbon atoms, or a lithium, sodium, potassium, magnesium, calcium, strontium, barium, zinc, aluminum, tin, or zirconium salt thereof. Particularly preferred are anti-yellowing additives in which there is used 0.05 to 0.5 part by weight of 1,3-diketone compound for each part by weight of overbased compound.

The 1,3-diketone compound can be represented by the formula

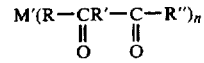

in which R is a hydrocarbon group, an alkoxy-hydrocarbon group or an alkylenedioxyhydrocarbon group each having up to 18 carbon atoms; R' is a hydrogen atom, an acyl group

where R''' is alkyl or aryl, or an R group; R'' is a hydrogen atom, a halohydrocarbon group, or an R group.

R, R', and R'' can be discrete groups; R can also be linked with R' or with R'' in a five to six membered carbocyclic or oxygen-containing heterocyclic ring structure. M' is hydrogen or a metal M selected from the group consisting of Li, Na, K, Mg, Ca, Sr, Ba, Zn, Al, Sn, or Zr; and n is an integer from 1 to 4 depending on the valence of M, when M' is hydrogen n is one.

Vinyl chloride polymer compositions containing the anti-yellowing additive of this invention are satisfactorily stabilized against deterioration during processing and the subsequent use with conventional stabilizers other than lead or cadmium compounds. Such stabilizers are used in concentrations of 0.1 to about 10 parts by weight per 100 parts by weight of vinyl chloride polymer and include 1,2-epoxides, certain organic nitrogen compounds, organic phosphites, and salts of hydrocarbon-substituted phenols and/or non-nitrogenous monocarboxylic acids having 6 to 30 carbon atoms with metals other than lead and cadmium.

DESCRIPTION OF THE PREFERRED EMBODIMENTS

The overbased metal compound component (A) of the anti-yellowing composition of this invention is characterized by an organic moiety, which is an environmentally acceptable alkali metal or alkaline earth metal salt of an organic sulfonic acid or of a phenol, and an inorganic moiety, which is an oxide, hydroxide, or carbonate of an environmentally acceptable alkali metal or alkaline earth metal, in intimate association with one another. As a result of the intimate assocation of the organic and inorganic moieties of the overbased metal compound, the results obtained in the use of these compounds in the anti-yellowing composition of this invention are far superior to results obtained with either the organic moiety, i.e. alkali and alkaline earth metal organic sulfonate or phenolate, or the inorganic moiety, i.e. alkali and alkali and alkaline earth metal oxide or hydroxide or carbonate, in the absence of the other.

The overbased organic sulfonates or phenolates of alkaline or alkaline earth metal used in the anti-yellowing composition of this invention can be represented by the formula YnMe.xMe'A in which Y stands for the residue of an organic sulfonic acid or a phenol; n is 1 or 2 depending on the valence of the metal Me, Me and Me' stand for an environmentally acceptable alkaline or alkaline earth metal; x is a positive number, which measures the surplus amount of metal in excess of that equivalent to the organic sulfonate or phenolate and A stands for the inorganic anion part of the basic metal compounds.

Environmentally acceptable alkaline or alkaline earth metals Me and Me' are sodium, potassium, lithium, calcium, magnesium, barium, and strontium.

The metal organic sulfonate moiety can be a salt of mahogany sulfonic acid, petroleum sulfonic acid, mono-eicosane-substituted naphthalene sulfonic acid, dodecylbenzene sulfonic acid, petroleum sulfonic acid, cetylchlorobenzene sulfonic acid, dilaurylbeta naphthol sulfonic acid, sulfonic acid produced by treating polyisobutene of 1500 mole weight with chlorosulfonic acid, nitronaphthalene sulfonic acid, paraffin sulfonic acid, acetylcyclopentane sulfonic acid, polyethylene (M.W. 750) sulfonic acid, diisodecylbenzene sulfonic acid, dicetylnaphthalene sulfonic acid, dilauryldiphenylether sulfonic acid, diisononylbenzene sulfonic acid, diisooctadecylbenzene sulfonic acid, stearylnaphthalene sulfonic acid, dilaurylbenzene sulfonic acid, laurylcetylbenzene sulfonic acid, polybutylene (M.W. 300-2500) benzene sulfonic acid, polypropylene (M.W. 290-1500) benzene sulfonic acid, naphthalene disulfide sulfonic acid, naphthalene disulfide disulfonic acid, cetylphenol disulfide sulfonic acid, cetylphenol monosulfide sulfonic acid, diphenylamine sulfonic acid, and thiophene sulfonic acid.

As above illustrated, the sulfonic acid used in the form of an overbased alkali or alkaline earth metal salt can be an alkylsulfonic acid, an arylsulfonic acid, and an alkaryl sulfonic acid. There is no upper limit for the carbon content of the sulfonic acid other than the availability of materials; sulfonic acids with as many as 150 carbon atoms give excellent results, as do mixtures of two or more sulfonic acids.

The metal phenolate moiety can be a salt of tert-butylphenol, nonylphenol, dinonylphenol, cyclohexylphenol, phenylphenol, octylphenol, phenol, cresol, xylenol, o-phenylphenol, n-butylphenol, isoamylphenol, ethylphenol, isopropylphenol, isooctylphenol, 2-ethylhexylphenol, tert-nonylphenol, decylphenol, tert-octylphenol, isohexylphenol, octadecylphenol, diisobutylphenol, dodecylphenol, methylpropylphenol, diamylphenol, methylisohexylphenol, methyl-t-octylphenol, methylenebis-di-nonyl-phenol, 4,4'-thiobis(2-t-butyl-5-methylphenol), t-amylphenol sulfide, 2,2'-thiobis(4-octylphenol), 2,2'-thiobis(4-dodecylphenol), nonylphenol disulfide and so on.

As above illustrated, the phenol used in the form of an overbased alkali or alkaline earth metal salt can be phenol itself, an alkylphenol, an arylphenol, a cycloalkylphenol, an aralkylphenol, and a bisphenol having a plurality of hydroxyaryl groups linked together directly or through sulfur or through an alkylidene group. There is no upper limit on the carbon content of the phenol other than the availability of materials; phenols with as many as 80 and more carbon atoms, resulting for example from the alkylation of phenol with long chain olefins derived from paraffin wax, give excellent results. Mixtures of the salts of the illustrated phenols with one another and with the sulfonate salts mentioned previously also give good results.

The overhead organic sulfonates and phenolates of alkaline and alkaline earth metals used in the anti-yellowing composition of this invention can be prepared by the reaction of organic sulfonic acids or phenols with a quantity of basic metal compounds (oxides, hydroxides, carbonates and so on) exceeding that equivalent to the sulfonic acid or phenol.

The surplus amount of basic metal compound above the equivalent to the sulfonic acid or phenol is variable from ca. 0.1 to ca. 30 or more times the equivalent amount. The reaction mixture can be treated by carbon dioxide to decrease excessive basicity.

The overbased organic sulfonate and phenolates of alkaline or alkaline earth metals can also be prepared by reacting metal normal salts of organic sulfonic acids or phenols with basic metal compounds such as metal oxides, hydroxides, carbonates and so on in a solvent.

The following synthesis examples are for the preparation of overbased organic sulfonates and phenolates of alkali and alkaline earth metals.

SYNTHESIS EXAMPLE—1 Liquid overbased barium nonylphenolate

Nonylphenol 110 g (0.5 mole), toluene 80 g, octanol 20 g and barium oxide 115 g (0.75 mole) were stirred and treated with 13.5 g water. Reaction proceeded with exothermic heat, and was continued nder reflux for 1 hour. After cooling, the mixture was filtered and there was obtained a black-green liquid overbased barium nonylphenolate complex, which was analyzed to find barium: 28% metal ratio: 6.

SYNTHESIS EXAMPLE—2 Liquid overbased barium carbonate-barium nonylphenolate

Into half of the product of Synthesis Example 1 there was introduced carbon dioxide gas under reflux for 5 hours. The complex compound obtained is a gray viscous liquid, which was characterized to be overbased barium nonylphenolate-carbonate complex.

SYNTHESIS EXAMPLE—3 Overbased barium carbonate-barium nonylphenolate

Barium carbonate 1.5 mole and barium nonylphenolate 1.0 mole were reacted in the mixed solvent of toluene-isooctanol (4:1), to prepare overbased barium nonylphenolate-carbonate complex, which was analyzed to find barium: 23% and metal ratio:5.

SYNTHESIS EXAMPLE—4 Overbased magnesium carbonate-magnesium dodecylbenzenesulfonate Magnesium oxide and dodecylbenzene sulfonic acid were reacted in the mixed toluene-isooctanol solvent, followed by treatment with carbon dioxide gas to obtain overbased magnesium dodecylbenzene sulfonate-carbonate complex, which had metal ratio of 10.

SYNTHESIS EXAMPLE—5 Overbased sodium carbonate-barium nonylphenolate

Barium nonylphenolate 1 mole and sodium carbonate 1 mole were reacted in an aromatic hydrocarbon medium (Solvesso 150) and there was obtained overbased barium-sodium nonylphenolate-carbonate complex with a metal ratio of 4.

Overbased complexes available on the market can be also used without modification. They are, for example, LD 2105 calcium thiobis dodecylphenolate-carbonate complex (Lubrizol Corp.) d=1.06 (60° F.), Ca=7.2%; LD 2106 barium nonylphenolate-carbonate complex (Lubrizol Corp.) d=1.3 (60° F.), Ba=27.5%; LD 2110 calcium sulfonate (Lubrizol Corp.) d=1.22 (60° F.), Ca=15.5%; Calcium Petronate HMW calcium petroleum sulfonate complex (Witco); Calcium Petronate 25C: calcium petroleum sulfonate-carbonate complex (Witco) Ca=3%; Calcium Petronate 25H; calcium petroleum sulfonate complex (Witco) Ca=3%; overbased barium petronate barium petroleum sulfonate-carbonate complex (Witco) Ba=14.1%.

A particularly preferred subgroup of overbased metal organic sulfonate and phenolate components of anti-yellowing compositions according to this invention is represented by visually clear liquid alkaline earth metal carbonate-alkaline earth metal organic sulfonate and alkaline earth metal carbonate-alkaline earth metal phenolates that leave no residue on filtration and when combined with a 1,3-diketone compound component according to this invention afford, immediately upon mixing or after a suitable interaction period at 20-200° C. for up to 24 hours, homogeneous liquid anti-yellowing compositions that are miscible and compatible with a broad range of liquid environmentally acceptable stabilizers for vinyl chloride polymers. Such overbased metal organic sulfonate and phenolate components are represented by the formula $Y_n Me.x Me'A$ in wich Y is the residue of an organic sulfonic acid having at least 20 carbon atoms or a phenol having at least 10 carbon atoms; n is 1 or 2 depending on the number of phenolic and/or sulfonic acid groups attached with Y; Me and Me' are each an environmentally acceptable alkaline earth metal and can be the same or different; x is a number from 1 to about 20, and A is carbonate.

Many liquid barium, calcium, and magnesium carbonate-organic salt combinations fitting the above definition are known in the art. The compositions are called "overbased" to indicate that the ratio of total metal contained to the organic moiety is greater than the stoichiometric ratio of the neutral organic salt, i.e. the number of metal equivalents is greater than the number of equivalents of sulfonic acid or of phenol. To characterize these compositions, the total metal content can be determined by standard methods and compared to that part of the metal content present as carbonate. The latter quantity can be demonstrated, when the organic salt is a sulfonate, by titration according to ASTM method D 2896-70 T, while the quantity of metal that is linked to the sulfonic acid is not titrated in this determination. The metal ratio is then given by the expression $$2 \times \frac{\text{total equivalents of metal per g. of sample}}{\text{total equivalents of metal per g. of sample} - \text{equivalents metal per g of sample by ASTM D-2896-70T titration}}$$

Alternatively, the metal present as carbonate is measured in terms of the combined carbon dioxide content and the metal ratio is given by the expression:

$$2 \times \frac{\text{total equivalents of metal/g of sample}}{\text{total equivalents of metal/g of sample} - \text{equivalents } CO_2/g.}$$

This method is applicable to both alkaline earth metal phenolates and sulfonates as the overbased organic salt component of the anti-yellowing composition of this invention. The metal ratio of the particularly preferred overbased organic salt component is greater than 2 and ranges to about 40.

The particularly preferred liquid overbased barium, calcium, and magnesium carbonate-phenolate and organic sulfonate compositions can be readily prepared by suspending a barium, calcium, or magnesium base, e.g., oxide, hydroxide, alkoxide, carbide, hydride, phenate, etc. in a polar organic medium, carbonating the metal compound at elevated temperatures and transferring the carbonated product to a low volatile organic liquid containing a metal organic sulfonate and/or phenolate salt with or without subsequent hydrolysis and removal of volatiles before final filtration of the resulting liquid. The sequence of operations is not critical; the organic sulfonate or phenolate salt can be present during carbonation or subsequently added.

The polar organic medium used for the reaction can contain volatile polar compounds such as methanol, ethylene glycol, 2-ethoxyethanol and ammonia, and non-volatile polar compounds such as long chain aliphatic alcohols and ether-alcohols, urea, and metallic halides. The volatile polar compounds are usually removed during the process and are not present in the finished product.

The following synthetic examples illustrate methods of preparing liquid combinations of organic sulfonate and phenolate salts with calcium, magnesium, carbonate for use in liquid anti-yellowing compositions of this invention.

SYNTHESIS EXAMPLE—6 Liquid calcium carbonate-calcium polydodecylbenzene sulfonate Two hundred grams of a mineral oil-naphtha solution of polydodecylbenzene sulfonic acid containing 28.3 weight percent of sulfonic acid, 23.5% of mineral oil, and 48.2% of naphtha was charged to a 1-liter, 3-necked flask equipped with a stirrer, dropping funnel, thermometer and condenser. Additional mineral oil was added, 49 g., to yield a final product solution of 30% overbased metal sulfonate active material. Then 13.4 g. of calcium oxide (CaO) was added. The mixture was heated, with stirring to about 45° C. and 25 g. of acetal (1,1-diethoxy ethane) were added dropwise over a 30 minute period; the temperature rose to about 65° C. The acetal and calcium oxide appeared to have passed into solution. Water, 5 g. was added dropwise over a 10 minute period, and the contents of the flask rapidly rose to reflux temperature. Stirring was continued for about 30 minutes to permit complete reaction of the water.

Then the flask was maintained in the range of 150°-175° C. until volatile materials had been distilled out; the volatile materials were water, acetal and naphtha. The stripped solution of overbased calcium sulfonate and mineral oil was bright and clear.

The calcium hydroxide content of the stripped product solution was converted to calcium carbonate by blowing the hot stripped solution with carbon dioxide gas for about 20 minutes.

The carbon dioxide treated solution was bright and clear; no filtering was necessary. The solution of overbased calcium carbonate-calcium sulfonate in mineral oil had a base number of 101 and a metal ratio of 6.2.

SYNTHESIS EXAMPLE—7 Liquid calcium carbonate-calcium nonyl thiobisphenolate

A solution containing 155 grams of nonylphenol sulfide and 400 ml. of anhydrous methanol was prepared in a two liter 4-necked reaction flask equipped with a stirring mechanism, a thermometer, a condenser and a gas inlet tube. To this solution were added 46 grams (0.8 mole) of calcium oxide. The mixture was stirred and maintained at a temperature of between 19° and 23° C.

Carbon dioxide was added at a rate of 400 ml. per minute. The carbonation was continued for 22 minutes, until the reaction mixture had taken up 18 grams (0.409 mole) of carbon dioxide. This is a molar ratio of 0.5 $CO_2$/Ca. At this point, 295 grams of a solvent-refined mineral oil were added and the reaction mixture was brought to a temperature of 150° C., thereby stripping off the methanol. The reaction flask was sparged with nitrogen gas. Using a diatomaceous earth filter aid the residual reaction mixture was filtered through a heated Buchner funnel to yield 456 grams of liquid product having the following analysis.

| | |
|---|---|
| Calcium | 5.25% |
| Carbon Dioxide | 2.1% |
| Total Base Number(mgKOH/g) | 147. |
| Metal Ratio | 11.2 |

SYNTHESIS EXAMPLE—8 Liquid magnesium carbonate-magnesium alkylbenzenesulfonate A reaction mixture comprising 906 grams (1.5 equivalents) of an oil solution of alkylphenylsulfonic acid having average molecular weight—450, 564 grams of mineral oil, 600 grams of toluene, 95.7 grams of magnesium oxide (4.4 equivalents), and 120 grams of water was carbonated at a temperature of about 78°–85° C. for about seven hours at a rate of about eighty liters of carbon dioxide per hour during which time the reaction mixture was constantly agitated. The carbonation was stopped and the reaction product stripped by heating to 165° C. at a pressure of 20 mm. (Hg.). The stripped product was filtered. The filtrate was an oil-solution of the desired basic magnesium sulfonate having a metal ratio of about 3.

SYNTHESIS EXAMPLE—9 Liquid barium carbonate-barium heptylphenolate

To a mixture of 268 grams (1.0 equivalent) oleyl alcohol, 124 grams (0.6 equivalent) of heptylphenol, 1000 grams of mineral oil, and 190 grams of water was added at 70° C. 306 grams (4.0 equivalents) of barium oxide. This mixture was heated at reflux temperature for an hour and then treated with carbon dioxide at 150° C. until the mixture was neutral. The mixture was filtered through Hyflo to yield a liquid product having the following analyses:

| | |
|---|---|
| Percent Sulfate Ash | 20.9 |
| Metal Ratio | 5.3 |

SYNTHESIS EXAMPLE—10 Liquid calcium carbonate-calcium petroleum sulfonate

To a 240 liter stainless steel reactor there was charged 40 kg. of 42 wt. percent lubricating oil solution of calcium sulfonate having a molecular weight of about 1000 derived the sulfonation of a lubricating oil stock, said solution having the following analysis.

| | |
|---|---|
| Calcium, wt. percent | 2.8 |
| Sulfur, wt. percent | 2.2 |
| Total Base No. | 49.3 |
| Metal Ratio | 1.0 |
| Viscosity 99° C. cs | 97.6 |
| Sp. Gr., 15° C. | 0.98 |
| Diluent oil, wt. percent | 58 |

In addition there was charged 31 kg of naphthenic hydrocarbon lubricating oil, 60 kg of heptane, 15 kg of methanol and 31 kg of hydrated lime. Agitation was initiated and the reactor vents were blocked off for total reflux conditions. The reaction mixture was heated to 60° C. and 14 kg of $CO_2$ were charged, to the reactor over a 4 hour period under total reflux conditions while maintaining the reactor temperature within the range of 62° to 68° C. At the end of the $CO_2$ charge the reactor was vented to the atmosphere. The filtered product, after stripping at 120° C. at 10 mm. Hg pressure for 3 hours to remove water, methanol and heptane, was a lube oil solution of an overbased calcium carbonate-calcium-sulfonate which analyzed as follows:

| | |
|---|---|
| Calcium, wt. percent | 13.8 |
| Sulfur, wt. percent | 1.3 |
| Metal Ratio | 34.0 |
| Total Base No. | 351 |
| Viscosity cs., at 99° C. | 55.5 |
| Sp. Gr., 15° C. | 1.21 |
| Oil Content, wt. percent | 55 |

A number of liquid combinations of calcium, barium, and magnesium organic sulfonate and phenolate salts with calcium, barium, and magnesium carbonate are commercially available and suitable for use in preparing particularly-preferred liquid anti-yellowing compositions and liquid environmentally acceptable stabilizer compositions with anti-yellowing properties according to this invention.

Illustrative are the following:

| MATERIAL | SUPPLIER | TYPICAL PROPERTIES |
|---|---|---|
| Calcium carbonate-calcium petroleum sulfonate (Grade 300) | Sonneborn Div. Witco Chem. Corp. New York, N.Y. | Base No. 300, 11.7% Ca, metal Ratio 21.4 |
| Calcium Carbonate-Calcium petroleum sulfonate (Grade 25C) | Sonneborn Div. Witco Chem. Corp. New York, N.Y. | Base No. 25, 3.0% Ca, metal ratio 2.9 |
| Magnesium carbonate-magnesium petroleum sulfonate | Conoco Chemicals Continental Oil Corp. Saddle Brook, N.J. | Two grades, Base Nos. 300 and 400 |
| Calcium carbonate-calcium polydodecyl benzene-sulfonate | Continental Oil Corp. | Two grades, Total base Nos. 300 and 400 |
| Calcium carbonate-calcium dodecyl thiobisphenolate | Lubrizol Corp. Wickliff, Ohio | Base No. 260, 9.3% Ca, 2.1% S, Metal ratio 7.2 |
| Barium carbonate-barium petroleum sulfonate | Sonneborn Division Witco Chemical Corp. New York, N.Y. | Base No. 68 14.1% Ba Metal ratio 4.9 |
| Barium carbonate- | Conoco Chemicals | Base no. 65 |

| MATERIAL | SUPPLIER | TYPICAL PROPERTIES |
|---|---|---|
| barium polyalkyl-benzene sulfonate | Continental Oil Corp. Saddle Brook, N.J. | 14% Ba metal ratio 4.6 |
| Barium carbonate- | Conoco Chemicals | Base no. 190 |
| barium petroleum sulfonate | Continental Oil Corp. Saddle Brook, N.J. | 27% Ba, metal ratio 14.6 |
| Barium carbonate-barium alkylphenolate | Lubrizol Corp. Wickliffe, Ohio | 26% Ba (also 21% and 23% Ba grades) |

The 1,3-diketone compound component (B) of the anti-yellowing additive of this invention is one of a class of known 1,3-diketone compounds represented by the formula

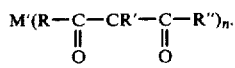

When in this formula M' is a hydrogen atom, the formula becomes

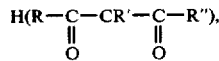

which is a way to indicate by a single expression that the hydrogen atom can be linked in more than one way, as in the tautomeric formulas I to III (i.e. formulas of compounds in readily movable equilibrium with one another)

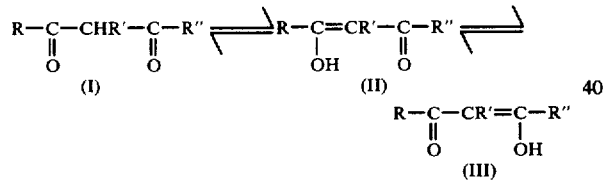

the latter two of which are identical when R and R" are the same and non-identical when R and R" are different. The relative proportions of tautomers I, II, and III in the 1,3-diketone compounds is a function of the identity or R and R"; for example the enol content (i.e. combined content of the C=C containing tautomers II and III) has been reported as 76.4% for diacetylmethane (R=R"=methyl) and 89.2% for acetylbenzoylmethane (R=methyl, R"=phenyl) (see A. Gero, J. Organic Chem. 1954, vol. 19, p. 1960-1970). When M is a metal, the formula

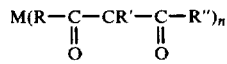

indicates that, while numerous structural formulas can be written differing in the location of various linkages (as illustrated for zinc acetylbenzoylmethane by formulas IV to VII below), all are equivalent representations of a single compound which is better represented as a "hybrid" of all formulas than by any single one. In formulas IV to VII, Ph represents phenyl and Me represents methyl.

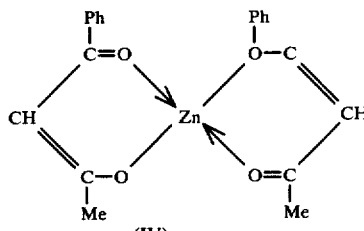
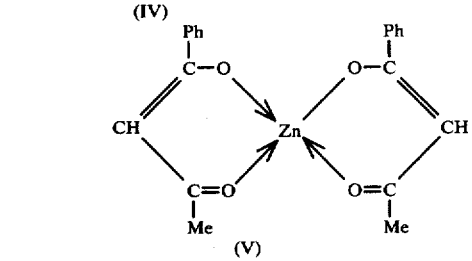
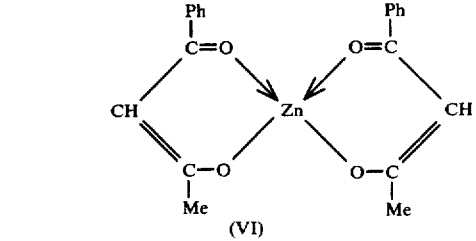
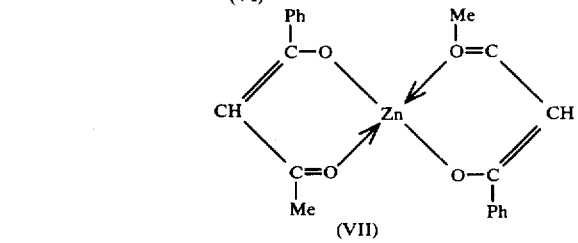

In the formula of 1,3-diketone metal compounds, n is the valence of the metal and the number of 1,3-diketone groups per metal atom, as shown:

| M | Li | Na | K | Mg | Ca | Sr | Ba | Zn | Al | Sn | Zr |
|---|---|---|---|---|---|---|---|---|---|---|---|
| n | 1 | 1 | 1 | 2 | 2 | 2 | 2 | 2 | 3 | 2 or 4 | 2(zirconyl) or 4 |

Hydrocarbon groups, R, R', R", and R'" can be open chain or cyclic and include such aliphatic, cycloaliphatic, and aromatic hydrocarbon groups as alkyl and alkenyl groups having 1 to 18 carbon atoms, cycloalkyl, cycloalkenyl and cycloalkylalkylene, and alkylcycloalkyl groups having 5 to 18 carbon atoms, and non-condensed aryl groups (including aralkyl and alkyaryl) having 6 to 18 carbon atoms, for example methyl, ethyl, propyl, isopropyl, isobutyl, n-butyl, s-butyl, t-butyl, 1-pentyl, 3-pentyl, 1-hexyl, 1-heptyl, 3-heptyl, 1-octyl, 2,4,4-trimethylpentyl, t-octyl, nonyl, decyl, tridecyl, pentadecyl, heptadec-8-en-1-yl, n-octadecyl, allyl, methallyl, 2-hexenyl, 1-methylcyclopentyl, cyclohexyl, cyclohexanepropyl, phenyl, m-tolyl, p-ethylphenyl, t-butylphenyl, benzyl, phenylpropyl and nonylbenzyl. Halohydrocarbon R, R', R", and R'" groups include dichloromethyl, heptafluoropropyl, p-bromophenyl, and 3,4-dichlorobenzyl. Alkoxyhydrocarbon R, R', R", and R'" groups include ethoxymethyl, n-butoxymethyl, 2-methoxyethyl, 2-methoxyphenyl, and 4-n-octoxyphenylbenzyl. R, R', R", and R'" alkylenedioxyhydrocarbon groups include 3(ethylenedioxypropyl) and 3,4-methylenedioxyphenyl.

R' as well as either but not both of R and R" can be hydrogen.

When the groups R and R' are linked to form an oxygen-heterocyclic ring, the 1,3-diketone compound can be for example dehydroacetic acid, dehydropropionylacetic acid, and dehydrobenzoylacetic acid. When the groups R and R' are linked to form a carbocyclic ring, the 1,3-diketone compound can be for example 2-acetyl-1-tetralone, 1-palmitoyl-2-tetralone, 2-stearoyl-1-tetralone, 2-benzoyl-1-tetralone, 2-acetyl-cyclohexanone, and 2-benzoylcyclohexanone. When the groups R and R" are linked to form a carbocyclic ring, the 1,3-diketone compound can be for example cyclopentane-1,3-dione, cyclohexane-1,3-dione, 5,5-dimethylcyclohexane-1,3-dione, 2,2'-methylenebis(cyclohexane-1,3-dione), and 2-acetylcyclohexane-1,3-dione. When R, R' and R" are discrete groups, the 1,3-diketone compound can be, for example, benzoyl-p-chlorobenzoylmethane, bis(4-methyl-benzoyl)methane, bis(2-hydroxybenzoyl)methane, benzoylacetylmethane, tribenzoylmethane, diacetylbenzoylmethane, stearoylbenzoylmethane, palmitoyl-benzoylmethane, lauroylbenzoylmethane, dibenzoyl methane, 4-methoxybenzoyl-benzoylmethane, bis(4-methoxybenzoyl)methane, bis(4-chlorobenzoyl)methane, bis(3,4-methylenedioxybenzoyl)methane, benzoyl-acetyl-octylmethane, benzoyl-acetyl-phenylmethane, stearoyl-4-methoxybenzoylmethane, bis(4-t-butylbenzoyl)methane, benzoyl-acetyl-ethylmethane, benzoyl-trifluoroacetyl-methane, diacetylmethane, butanoyl-acetylmethane, heptanoyl-acetylmethane, triacetylmethane, stearoylacetylmethane, palmitoyl-acetylmethane, lauroyl-acetylmethane, benzoylformylmethane, acetyl-formyl-methylmethane, benzoyl-phenylacetylmethane, bis(cyclohexane-carbonyl)methane, and dipivaloylmethane. The Li, Na, K, Mg, Ca, Sr, Ba, Sn, Zr, and Zn salts of the above beta-diketone compounds can also be used.

The particularly preferred homogeneous liquid anti-yellowing compositions are prepared by mixing together the 1,3-diketone and liquid alkaline earth carbonate components, and heating where necessary until a homogeneous liquid is obtained. Such liquid anti-yellowing compositions can subsequently be blended with environmentally acceptable vinyl chloride polymer stabilizer compositions in accordance with the invention or with certain individual ingredients thereof.

Such ingredients can be present during the preparation of the anti-yellowing composition as desired. A non-limiting list of anti-yellowing compositions that can be prepared in accordance with this invention follows. All parts are by weight.

| NO. | COMPONENTS | METAL RATIO | MIXING TIME HRS. | MIXING TEMP. °C. | Parts |
|---|---|---|---|---|---|
| 1 | Barium carbonate-barium nonylphenolate | 9.0 | 1 hr | 130 | 100 |
|  | Diacetylmethane |  |  |  | 30 |
| 2 | Calcium carbonate-calcium dodecyl thiobisphenolate | 7.2 | 1 | 140 | 100 |
|  | Diacetylmethane |  |  |  | 20 |
| 3 | Calcium carbonate-calcium petroleum sulfonate | 21.6 | 1 | 140 | 100 |
|  | Diacetylmethane |  |  |  | 20 |
| 4 | Calcium carbonate-calcium dodecyl-thiobisphenolate | 7.2 | 1 | 140 | 100 |
|  | Acetylbenzoylmethane |  |  |  | 20 |
| 5 | Calcium carbonate-calcium dodecyl thiobisphenolate | 7.2 | 1 | 140 | 100 |
|  | Dibenzoylmethane |  |  |  | 20 |
| 6 | Barium carbonate-barium nonylphenolate | 9.0 | 1 | 140 | 100 |
|  | Dibenzoylmethane |  |  |  | 40 |
| 7 | Barium carbonate-barium nonylphenolate | 9.0 | 1 | 130 | 50 |
|  | Calcium carbonate-calcium didecyl thiobisphenolate | 7.2 |  |  | 50 |
|  | acetylbenzoylmethane |  |  |  | 10 |
| 8 | Magnesium carbonate-magnesium petroleum sulfonate | 3.0 | 1 | 130 | 100 |
|  | Dibenzoylmethane |  |  |  | 20 |
| 9 | Magnesium carbonate-magnesium petroleum sulfonate | 3.0 | 1 | 140 | 100 |
|  | Dibenzoylmethane |  |  |  | 10 |
|  | 2,6-di-t-butyl-p-cresol |  |  |  | 10 |
| 10 | Barium carbonate-barium petroleum sulfonate | 4.9 | 1 | 140 | 100 |
|  | Acetylbenzoyloctylmethane |  |  |  | 30 |

-continued

ANTI-YELLOWING COMPOSITIONS

| NO. | COMPONENTS | METAL RATIO | MIXING TIME HRS. | MIXING TEMP. °C. | Parts |
|---|---|---|---|---|---|
| 11 | Barium carbonate- | | 1 | 140 | |
| | barium petroleum sulfonate | | | | 100 |
| | Acetylbenzoyloctylmethane | 4.9 | | | 20 |
| | 2,6-di-t-butyl-p-cresol | | | | 20 |
| 12 | Calcium carbonate- | | 1 | 140 | |
| | calcium petroleum sulfonate | | | | 100 |
| | Acetylbenzoyloctylmethane | 21.4 | | | 20 |
| | 2,6-di-t-butyl-p-cresol | | | | 20 |
| 13 | Calcium carbonate-calcium | | | | |
| | dodecyl thiobisphenolate | 7.2 | 1 | 140 | 100 |
| | Diacetylmethane | | | | 10 |
| 14 | Calcium carbonate-calcium | | | | |
| | dodecyl thiobisphenolate | 7.2 | 1 | 140 | 100 |
| | Diacetylmethane | | | | 25 |
| 15 | Calcium carbonate-calcium | | | | |
| | dodecyl thiobisphenolate | 7.2 | 1 | 140 | 100 |
| | Diacetylmethane | | | | 30 |
| 16 | Calcium carbonate-calcium | | | | |
| | dodecyl thiobisphenolate | 7.2 | 1 | 140 | 100 |
| | Diacetylmethane | | | | 10 |
| | Tris(nonylphenylphosphite) | | | | 30 |
| 17 | Calcium carbonate-calcium | | | | |
| | petroleum sulfonate | 21.4 | 1 | 140 | 100 |
| | Dipivaloylmethane | | | | 5 |
| 18 | Calcium carbonate-calcium | | | | |
| | petroleum sulfonate | 21.4 | 1 | 140 | 100 |
| | Dipivaloylmethane | | | | 30 |
| 19 | Calcium carbonate- | | | | |
| | calcium petroleum | | | | |
| | sulfonate | 21.4 | 1 | 140 | 100 |
| | Dipivaloylmethane | | | | 10 |
| | Stannous 2-ethylhexoate | | | | 20 |
| 20 | Barium carbonate- | | | | |
| | barium nonylphenolate | 9.0 | 1 | 100 | 100 |
| | Diacetylmethane | | | | 10 |
| | Isooctyl epoxy stearate | | | | 50 |
| 21 | Calcium carbonate-calcium | | | | |
| | dodecyl thiobisphenolate | | 1 | 140 | 100 |
| | Diacetylmethane | 7.2 | | | 10 |
| | Zinc neodecanoate | | | | 10 |

The anti-yellowing additive of this invention is useful in any environmentally acceptable stabilized vinyl chloride polymer. The term "vinyl chloride polymer" as used herein is inclusive of any polymer formed at least in part of the recurring group,

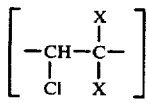

and having a chlorine content in excess of 40%. In this group, the X groups can each be either hydrogen or chlorine. In polyvinyl chloride homopolymers, each of the X groups is hydrogen. Thus, the term includes not only polyvinyl chloride homopolymers but also afterchlorinated polyvinyl chlorides as a class, for example, those disclosed in British Pat. No. 893,288 and also copolymers of vinyl chloride in a major proportion and other copolymerizable monomers in a minor porportion, such as copolymers of vinyl chloride and vinyl acetate, copolymers of vinyl chloride with maleic or fumaric acid or esters, and copolymers of vinyl chloride with styrene, propylene, ethylene, 1-hexene, or vinyl n-dodecyl ether. The invention also is applicable to mixtures of polyvinyl chloride in a major proportion with a minor proportion of other synthetic resins such as chlorinated polyethylene or copolymers of acrylonitrile with butadiene and styrene.

The invention is of application to the stabilization of rigid polyvinyl chloride resin compositions, that is, resin compositions which are formulated to withstand high processing temperatures, of the order of 190° C. and higher, and of plasticized polyvinyl cloride resin compositions of conventional formulation where resistance to heat distortion is not a requisite. The respective definition of rigid and plasticized resins are as follows. The rigid resins are those resins to which plasticizers are not added, and which are generally worked at about 190° C. The ASTM definition (1961 D-883, Part 9, page 804) is as follows:

"a plastic which has a stiffness or apparent molulus of esasticity greater than 7000 grams per square centimeter (100,000 psi) at 23° C."

The plasticized resin would therefore have a modulus of elasticity of less than 7000 grams per square centimeter, and would have added to it the plasticizer compound. Conventional plasticizers well known to those skilled in the art can be employed such as, for example, dioctyl phthalate, octyl diphenyl phosphate and epoxidized soybean oil. 1,2-Epoxides that can be used to stabilize vinyl chloride polymer compositions containing the anti-yellowing additive of this invention include epoxidized triglyceride oils such as epoxysoybean oil, epoxylinseed oil, epoxidized fish oils and epoxidized tallow; epoxidized esters such as methyl, isobutyl, and 2-ethylhexyl epoxystearates, epoxidized butyl and isooctyl esters of tall oil fatty acids, and 3,4-epoxycyclohexanemethyl 3,4-epoxycyclohexanecarboxylate; epoxidized hydrocarbons such as epoxidized polybutadiene and 1,2,5-tris(epoxyethyl)benzene; and epoxidized ethers such as 1,2,3-tris(2',3'-epoxypropoxy)propane and 4,4'-isopropylidenebis(phenyl glycidyl ether). A comprehensive disclosure of 1,2-epoxide stabilizers by T. Sekiguchi in U.S. Pat. No. 4,105,627 of Aug. 8, 1978, column 8 line 48 to column 9 line 40 is here incorporated by reference.

Organic phosphites that can be used to stabilize vinyl chloride polymer compositions containing the anti-yellowing additive of this invention include phenyl di-2-ethylhexyl phosphite, tri-isodecyl phosphite, and pentaerythritol diisooctyldiphosphite. A comprehensive disclosure of suitable organic phosphites by T. Sekiguchi in U.S. Pat. No. 4,105,627 of Aug. 8, 1978 column 9 line 41 to column 12 line 16 is here incorporated by reference.

Metal salts that can be used to stabilize vinyl chloride polymer compositions containing the anti-yellowing additive of this invention are preferably salts of at least one bivalent non-transition metal, such as barium, calcium, magnesium, strontium, stannous tin and zinc.

In the salt, the acid can be any organic non-nitrogenous monocarboxylic acid having from six to twenty-four carbon atoms.

The aliphatic, aromatic, alicyclic and oxygen-containing heterocyclic organic acids are operable as a class. By the term "aliphatic acid" is meant any open chain carboxylic acid, substituted, if desired, with non-reactive groups, such as halogen, sulfur and hydroxyl. By the term "alicyclic" it will be understood that there is intended any cyclic acid in which the ring is non-aromatic and composed solely of carbon atoms, and such acids may if desired have inert, non-reactive substituents such as halogen, hydroxyl, alkyl radicals, alkenyl radicals and other carbocyclic ring structures condensed therewith. The oxygen-containing heterocyclic compounds can be aromatic or non-aromatic and can include oxygen and carbon in the ring structure, such as alkyl-substituted furoic acid. The aromatic acids likewise can have nonreactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, n-octoic acid, isooctoic acid, 3,5,5-trimethyl hexoic acid, capric acid, undecyclic acid, lauric acid, myristic acid, palmitic acid, margaric acid, stearic acid, oleic acid, ricinoleic acid, behenic acid, chlorocaproic acid, hydroxy-capric acid, ethyl acetoacetic acid, benzoic acid, phenyl-acetic acid, butylbenzoic acid, ethylbenzoic acid, propylbenzoic acid, hexylbenzoic acid, salicylic acid, naphthoic acid, 1-naphth alene acetic acid, orthobenzoyl benzoic acid, naphthenic acids derived from petroleum, abietic acid, dihydroabietic acid, hexahydrobenzoic acid, and methyl furoic acid, as well as partially esterified dibasic acids such as monobutyl phthalate, isooctyl maleate, ethylene glycol maleate, and 2-ethoxy ethylmaleate.

In combination with the above metal salts of organic acids, or in lieu thereof, a metal salt of a hydrocarbon-substituted phenol can be used. The hydrocarbon substituents contain from four to twenty-four carbon atoms each. The metal can be an alkali metal or alkaline earth metal such as sodium, potassium, lithium, calcium, strontium, magnesium and barium. Among such polyvalent metal phenolates there can be mentioned the magnesium, barium, calcium, strontium, tin and zinc salts of n-butyl phenol, t-nonyl phenol, n-decyl phenol, t-dodecyl phenol, t-octyl phenol, isohexyl phenol, octadecyl phenol, diisobutyl phenol, methyl propyl phenol, diamyl phenol, methyl isohexyl phenol, methyl t-octyl phenol, di-t-nonyl phenol, ortho or para phenyl phenol. The modified metal phenolates disclosed by M. Pollock in U.S. Pat. No. 3,630,979 of Dec. 28, 1971 and by M. Minagawa in U.S. Pat. No. 3,733,288 of May 15, 1973 are also suitable. Mixtures of salts of various metals can be used, such as mixed zinc and tin salts with the alkaline earth metal salts, e.g., barium and zinc stearates, as in U.S. Pat. No. 2,446,976.

Preferred classes of additional stabilizers that can be used include the phenols; aliphatic polyhydroxy compounds; esters, amides, and hydrazides of thioalkylenedicarboxylic acids and nitrilotrialkylenetricarboxylic acids; and organic nitrogen compounds such as the esters of beta-aminocrotonic acid, diphenylthiourea, 2-phenylindole, and mercaptoheterocyclic nitrogen compounds having the characteristic group

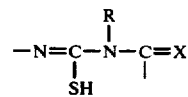

Phenol stabilizers can be included with the stabilizer composition of this invention in amounts corresponding to 0.01 to about 0.2 parts per 100 parts of polymer being stabilized. Typical phenol stabilizers are butylated hydroxy-toluene (BHT), 4,4'-isopropylidenebisphenol, and 1,1,3-tris(2'-methyl-4'-hydroxy-5'-t-butylphenyl)butane. A comprehensive disclosure of phenol stabilizers at column 16 line 49 to column 21 line 8 of M. Minagawa U.S. Pat. No. 3,849,370 issued Nov. 19, 1974 is here incorporated by reference.

Aliphatic polyhydroxy compounds can be included with the stabilizer composition of this invention in amounts corresponding to 0.1 to about 1 part per 100 parts of polymer being stabilized. Typical aliphatic polyhydroxy compounds are glycerol, polyglycerol, mono-, di-, and tri-pentearythritol, mannitol, sorbitol, and partial esters of these with saturated and unsaturated fatty acids having 6 to 22 carbon atoms.

The esters, amides, and hydrazides of thiodialkylene dicarboxylic acids and nitrilotri-alkylenetricarboxylic acids can be included with the stabilizer composition of this invention in amounts corresponding to 0.1 to about 1 part per 100 parts of polymer. Typical of these are dimethyl thiodipropionate, dilauryl and distearyl thiodipropionates, 2,2'-thiobis(acetyl ethanolamine), 3,3'-thiobis(propionyldiisopropanolamine, nitrilotriacetic acid (NTA) propylene glycol ester, NTA tris (ethylamide), NTA bis(hydroxyethyl) N-butylamide, 3,3'-thiodipropionyldihydrazide and 6,6'-thiodihexanoyldihydrazide. A comprehensive disclosure of thiodipropionate compounds that can be used from column 21 line 9 to column 22 line 65 of M. Minagawa U.S. Pat. No. 3,849,370 is here incorporated by reference.

Organic nitrogen compounds that can be used with the stabilizer compositions of this invention in amounts of about 0.05 to about 0.5 parts per 100 parts of polymer being stabilized include 2-ethylhexyl 3-aminocrotonate, 1,4-butanediol bis(3-aminocrotonate) and 2,2'-thiodiethyl 3-aminocrotonate; thiocarbanilide and 2-phenylindole, 1,3-dibutylthiourea, phenylurea, and p-ethoxyphenylurea. Particularly preferred organic nitrogen compounds include the mercaptoheterocyclic nitrogen compounds having in a 5 or 6 membered ring the characteristic group

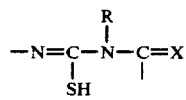

in which R is hydrogen, aryl, or alkyl having 1 to 12 carbon atoms and X is oxygen or sulfur. Examples of such mercaptoheterocyclic nitrogen compounds include 3,5-dimercapto-1,2,4-triazole, 2,4,6-trimercapto-1,3,5-triazines, and 2-anilino-4,6-dimercaptotriazine magnesium salt. A comprehensive disclosure of such mercaptoheterocyclic compounds by T. Sekiguchi in U.S. Pat. No. 4,105,627 of Aug. 8, 1978, Col. 3 line 52 to col. 8 line 47 is here incorporated by reference.

The anti-yellowing compositions in accordance with this invention as well as stabilizer compositions comprising these, can be in solid, liquid or paste form. Liquid compositions can be prepared by blending the ingredients and heating at 40° to 200° C. for up to 6 hours to achieve visual homogeneity and storage stability. Inert ingredients that can be added to the anti-yellowing compositions and stabilizer compositions to improve their handling convenience include solvents such as hydrocarbons, 2-ethylhexanol, isodecyl alcohol, 2-ethoxyethanol, and 2(2-butoxyethoxy)ethanol; paste consistency modifiers such as finely divided silica, polyethylene glycols and polypropylene glycols and their monoalkyl and monaryl ethers, and water; anticaking agents such as talc, magnesium trisilicate, sodium silicoaluminate, and aluminum calcium silicate.

Following are the methods used in testing vinyl chloride polymer compositions containing anti-yellowing compositions according to this invention or control compositions used for comparison purposes.

Oven heat stability: Samples of each indicated formulation proportioned to 200 grams of vinyl chloride polymer are compounded on a two-roll mill until well mixed and removed in the form of sheets 1 mm in thickness. Strips cut from each sheet are exposed in an air circulating oven at the indicated temperature, and one strip of each formulation removed every five minutes and attached to a record card. Heat stability is recorded as the time in minutes to the first failure point represented by a deep orange, red, brown or black color.

Initial color and heat color: These properties are rated by means of the Hunter colorimeter and expressed as % yellowness, smaller numbers indicating less yellow samples. Initial color refers to yellowness measured with a sample as removed from the mill. Heat color refers to yellowness measured with a sample heated in an air circulating oven at the indicated temperature for the time shown.

Plate-out: Calender or roll plate-out is caused by an incompatibility of vinyl chloride polymer compound constituents under processing conditions with subsequent deposit on the rolls of the equipment. As the deposit builds up in thickness, it will affect the surface appearance of the vinyl sheeting being produced and it may interfere with heat sealability and printability of the material.

Plate-out is measured through incorporation in the test compound of a red pigment which tends to disperse within the plate-out layer. The red plate-out layer on the mill rolls is then picked up by a clean-up batch. The extent of discoloration of the clean-up batch is a measure of the test compound's tendency to plate-out. The test procedure is as follows:

There is added to the test compound 2 phr of a 50% pigment dispersion in DOP of Permanent Red 2B pigment. The test compound is charged to the laboratory mill and allowed to run on the mill without disturbing it 3 minutes after the compound is fused and well mixed. The mill temperature is 172°–177° C. After 3 minutes, the red pigmented compound is removed from the mill and discarded. The following clean-up compound is then charged to the mill and run for 3 minutes.

| Resin | 100 parts by weight |
|---|---|
| DOP | 30 |
| TiO$_2$ | 2 |
| Precipitated silica | 2 |
| Liquid cadmium-barium stabilizer | 2 |
| Stearic acid | 0.5 |

The quantity of clean-up compound is proportioned to 200 parts of resin. The clean-up compound removes from the mill the plate-out and red pigment left from the test compound. The extent of color development of the clean-up compound is a measure of the test compound's plate-out characteristics. A numerical measure of plate-out is provided by comparing the colored clean-up compound with a series of standard compounds to which known amounts of the red pigment are added. The numerical "plate-out value", then, is the concentration of pigment, in mg/kg of resin, that most nearly matches the color of the clean-up compound at the end of the test.

The following examples in the opinion of the inventors represent preferred embodiments of their invention.

EXAMPLE 1

In order to examine the anti-yellowing effect of the composition of the present invention, samples of 20×15 mm were cut off from the sheet of 1 mm in thickness prepared by calendering and compression molding in accordance with the following formulation. The heat stability and heat color tests were carried out in a Geer oven at 190° C. The results are shown in Table 1.

TABLE - 1

| (FORMULATION) | |
|---|---|
| POLYVINYLCHLORIDE (Geon 103EP) | 100 parts by weight |
| DIOCTYLPHTHALATE | 50 |
| ZINC STEARATE | 0.3 |
| CALCIUM STEARATE | 0.3 |
| STEARIC ACID | 0.3 |
| TRISNONYLPHENYLPHOSPHITE | 0.5 |
| LD-2106 LIQUID BARIUM CARBONATE-BARIUM | |

TABLE - 1-continued

| | |
|---|---|
| ALKYLPHENOLATE (LUBRIZOL CORPORATION; 26% BARIUM). | 0.4 |
| 1,3-diketone (Table-1) | 0.1 |

| No. | 1,3-Diketone Compounds | 190° C. oven heat stability Min. | Hunter % yellowness Initial Color | Heat Color 190° C./30 Min. |
|---|---|---|---|---|
| Control | | | | |
| 1-1 | none | 50 | 30 | 62 |
| 1-2 | Calcium ethylacetoacetate | 65 | 24 | 47 |
| 1-3 | Octylbenzoylacetate | 60 | 19 | 43 |
| 1-4 | 2-acetylbutyro-1,4-lactone | 60 | 22 | 49 |
| 1-5 | None; 0.5 part LD 2106 | 55 | 30 | 54 |
| 1-6 | Dibenzoylmethane without LD2106 | 40 | 8 | 56 |
| EXAMPLE | | | | |
| 1-1 | Dehydroacetic acid | 85 | 7 | 15 |
| 1-2 | Cyclohexane-1,3-dione | 70 | 10 | 22 |
| 1-3 | 2-acetyl-1-tetralone | 70 | 9 | 20 |
| 1-4 | Acetyllauroylmethane | 75 | 8 | 18 |
| 1-5 | Acetylbenzoylmethane | 80 | 7 | 13 |
| 1-6 | Diacetylbenzoylmethane | 75 | 10 | 19 |
| 1-7 | Dibenzoylmethane | 85 | 6 | 12 |
| 1-8 | Zinc Dehydroacetate | 80 | 7 | 14 |
| 1-9 | Acetylbenzoylmethane magnesium | 75 | 8 | 16 |
| 1-10 | Dipivaloylmethane barium | 70 | 10 | 19 |
| 1-11 | Dibenzoylmethane zinc | 85 | 6 | 13 |
| 1-12 | Acetylbutanoylmethane calcium | 70 | 9 | 17 |
| 1-13 | 2-acetylcyclohexanone sodium | 70 | 11 | 21 |

The results of Examples 1—1 to 1-13 demonstrate the unexpectedly favorable effect of utilizing in combination a metal phenolate compound and a 1,3-diketone compound in accordance with this invention. Equally treated samples according to the invention are throughout less yellow than samples of Controls 1—1 and 1-5 lacking the beta-diketone component or samples of Controls 1-2, 1-3, or 1-4 containing Ketoester compounds not of this invention, moreover, all samples containing stabilizer composition of this invention heated 30 minutes at 190° C. are no more yellow than the unexposed sample of Control 1—1. Accordingly, the stabilizer compositions of this invention represent remarkably effective environmentally acceptable stabilizers.

EXAMPLE 2

A sheet was prepared according to the following rigid formulation, and submitted to an oven heat stability test at 190° C., initial color test and heat coloring test after 30 minutes at 190° C. measured by Hunter Colorimeter, and plate-out test. The results are shown in Table-2. Plate-out is indicated by the quantity of pigment in mg/kg plated out as described above.

TABLE 2

| (FORMULATION) | |
|---|---|
| POLYVINYLCHLORIDE | 100 parts by weight |
| ZINC STEARATE | 0.5 |
| BARIUM STEARATE | 0.2 |
| EPOXIDIZED SOYBEAN OIL | 3.0 |
| TETRA($C_{12-15}$ MIXED ALKYL) BISPHENOL A . DIPHOSPHITE | 1.0 |
| STEARIC ACID | 0.3 |
| LD-2106 LIQUID BARIUM CARBONATE-BARIUM ALKYLPHENOLATE | 0.5 |
| 1,3-DIKETONE (TABLE-2) | 0.1 |

| | 190° C. Oven Heat | % Hunter Yellowness | | |
|---|---|---|---|---|
| | | Initial | Heat | Plate |

TABLE 2-continued

| No. | 1,3-Diketone Compounds | Stability Min. | Color % | Color 190° C./30 Min. | Out/ mg/kg |
|---|---|---|---|---|---|
| Control | | | | | |
| 2-1 | Lauryl acetoacetate | 60 | 24 | 43 | 110 |
| 2-2 | Ethyl acetoacetate | 65 | 21 | 38 | 180 |
| 2-3 | None 0.6 part LD 2106 | 60 | 27 | 41 | 80 |
| 2-4 | Dehydroacetic acid 0.6 part, without LD 2106 | 50 | 8 | 46 | 220 |
| EXAMPLE | | | | | |
| 2-1 | Dehydroacetic acid | 100 | 8 | 13 | 20 |
| 2-2 | Dehydropropionyl-acetic acid | 90 | 9 | 15 | 25 |
| 2-3 | Tribenzoylmethane | 90 | 10 | 15 | 35 |
| 2-4 | Triacetylmethane | 80 | 10 | 18 | 40 |
| 2-5 | Dibenzoylmethane | 100 | 8 | 12 | 20 |
| 2-6 | Acetylstearoylmethane | 85 | 9 | 15 | 30 |
| 2-7 | Dimedone | 80 | 12 | 19 | 35 |
| 2-8 | Dehydroacetic acid Ba | 95 | 9 | 13 | 30 |
| 2-9 | Dibenzoylmethane Ca | 100 | 10 | 14 | 20 |
| 2-10 | Dibenzoylmethane Na | 90 | 11 | 16 | 30 |
| 2-11 | Acetylbenzoylmethane Zn | 95 | 10 | 13 | 25 |
| 2-12 | Acetylacetone Zn | 90 | 12 | 17 | 50 |

These results show that the yellowing tendency of this rigid PVC formulation is minimized by the presence of both an overbased metal phenolate compound and a 1,3 -diketone compound according to this invention. The simultaneous achievement of favorable initial color, long term stability, and plate-out properties is rare and unexpected.

EXAMPLE 3

To examine the effectiveness of the anti-yellowing composition in a stabilized PVC-ABS polymer blend, a sheet was prepared according to the following formulation, and subjected to a heat stability test at 175° C., an initial color test, and a heat coloring test after 60 minutes at 175° C. The results are shown in TABLE 3.

TABLE 3

| (FORMULATION) | |
|---|---|
| POLYVINYLCHLORIDE | 100 parts by weight |
| ACRYLONITRYL-BUTADIENE-STYRENE TERPOLYMER | 10 |
| DIOCTYLPHTHALATE | 10 |
| Zn OCTOATE | 0.5 |
| PHENYL DIISODECYL PHOSPHITE | 0.5 |
| STEARIC ACID | 0.4 |
| DEHYDROACETIC ACID | 0.05 |
| METAL COMPOUND SAMPLE (TABLE 3) | 0.7 |

| | | 175° C. OVEN HEAT STABILITY Min. | HUNTER % YELLOWNESS | |
|---|---|---|---|---|
| No. | METAL COMPOUND SAMPLE | | INITIAL COLOR % | HEAT COLOR 175° C./60Min. % |
| Control | | | | |
| 3-1 | Ba nonylphenolate | 90 | 21 | 37 |
| 3-2 | Ba carbonate | 80 | 25 | 42 |
| 3-3 | Ba stearate | 85 | 23 | 41 |
| 3-4 | Ba oxide | 70 | 28 | 46 |
| 3-5 | None; dehydro-acetic acid 0.75 part | 15 | 12 | — |
| 3-6 | LD 2106 liquid barium carbonate-barium alkyl-phenolate 0.75 part, without dehydroacetic acid | 110 | 33 | 45 |
| Example | | | | |
| 3-1 | LD-2105 liquid calcium carbonate-calcium thiobis (dodecylphenate) | 110 | 11 | 14 |
| 3-2 | LD-2106 liquid barium carbonate-barium alkylphenolate | >120 | 8 | 10 |
| 3-3 | LD-2110 liquid calcium carbonate-calcium petroleum sulfonate | 120 | 10 | 13 |
| 3-4 | Ca petronate HMW | | | |

TABLE 3-continued

|  |  |  |  |  |
|---|---|---|---|---|
|  | (Witco) liquid overbased calcium petroleum sulfonate | 110 | 11 | 16 |
| 3-5 | Ca petronate 25C (Witco) liquid overbased calcium carbonate-calcium petroleum-sulfonate | 120 | 10 | 14 |
| 3-6 | Ca petronate 25H (Witco) liquid overbased calcium hydroxide-calcium petroleum sulfonate | 110 | 12 | 16 |
| 3-7 | Basic Ba petronate (Witco) liquid overbased barium petroleum sulfonate | >120 | 8 | 11 |
| 3-8 | Synthesis Ex.-1 (liquid overbased Ba nonyl phenolate) | 120 | 10 | 15 |
| 3-9 | Synthesis Ex.-2 (Liquid Barium carbonate-Ba nonyl phenolate) | >120 | 9 | 11 |
| 3-10 | Synthesis Ex.-3 (liquid barium carbonate-Ba nonyl phenolate) | >120 | 8 | 11 |
| 3-11 | Synthesis Ex.-4 (Liquid magnesium carbonate-Mg dodecyl benzenesulfonate) | 110 | 10 | 14 |
| 3-12 | Syntheses Ex.-5 (Sodium Carbonate-Ba nonyl phenolate complex | 110 | 11 | 15 |

The results of these experiments demonstrate the remarkable ability of the anti-yellowing compositions of this invention to minimize yellowing prolonged heat exposure. All the compositions of Examples 3-1 to 3-12 were less yellow after 60 minutes exposure at 175° C. than control compositions containing basic barium compounds not if this invention right off the compounding mill, without any heat exposure. At the same time, a control composition with dehydroacetic acid alone (in the same amount as the total amount of anti-yellowing composition in the other samples) while good in initial (off-mill) color was wholly insufficient in heat stability; even the initial color of this control composition was inferior to all but one of the compositions of this invention.

EXAMPLE 4

To examine the effectiveness of anti-yellowing compositions of this invention in stabilized vinyl chloride polymer compositions containing a white colorant, a sheet was prepared according to the following formulation, and submitted to the same test as in Example-3. The results are shown in Table-4.

TABLE 4

| (FORMULATION) | |
|---|---|
| POLYVINYL CHLORIDE | 100 parts by weight |
| ABS RESIN | 10 |
| DIOCTYL PHTHALATE | 10 |
| TITANIUM DIOXIDE | 5 |
| Zn TOLUATE | 0.8 |
| Ba 12-HYDROXYSTEARATE | 0.3 |
| STEARIC ACID | 0.2 |
| OCTYLDIPHENYLPHOSPHITE | 0.3 |
| LD-2106 LIQUID BARIUM CARBONATE-BARIUM ALKYL-PHENOLATE | 0.5 |
| 1,3-DIKETONES (TABLE-4) | 0.1 |

| | | | HUNTER YELLOWNESS | |
|---|---|---|---|---|
| No. | 1,3-Diketones | 175° C. oven Heat Stability | INITIAL COLOR | HEAT COLOR 175° C./60 min. |
| CONTROL | | | | |
| 4-1 | NONE | 75 | 23 | 39 |
| 4-2 | DIETHYL MALONATE | 80 | 21 | 36 |
| 4-3 | ETHYL ACETOACETATE | 90 | 16 | 29 |
| 4-4 | ETHYL ACETOACETATE Ca | 90 | 15 | 26 |
| 4-5 | NONE; 0.6 part LD 2106 | 80 | 22 | 35 |
| 4-6 | Dehydroacetic acid 0.6 part, without LD 2106 | 50 | 7 | — |

TABLE 4-continued

| EXAMPLE | | | | |
|---|---|---|---|---|
| 4-1 | Dehydroacetic acid | >120 | 8 | 10 |
| 4-2 | Dehydrobenzoylacetic acid | 120 | 10 | 13 |
| 4-3 | Benzoylacetyloctylmethane | 110 | 11 | 15 |
| 4-4 | Bis(2-hydroxybenzoyl)methane | 115 | 10 | 14 |
| 4-5 | Dibenzoylmethane | >120 | 18 | 10 |
| 4-6 | Delauroylmethane | 110 | 11 | 14 |
| 4-7 | Dehydroacetic acid Na | >120 | 9 | 12 |
| 4-8 | Dibenzoylmethane K | 120 | 9 | 12 |
| 4-9 | Dibenzoylmethane Ca | >120 | 8 | 11 |
| 4-10 | Dibenzoylmethane Ba | >120 | 9 | 11 |
| 4-11 | Benzoylacetylmethane Sr | 120 | 10 | 13 |
| 4-12 | Dehydroacetic acid Zn | >120 | 8 | 10 |

The results of these experiments further demonstrate the surprising ability of the anti-yellowing compositions of this invention to minimize yellowing of a stabilized vinyl chloride polymer composition during prolonged heat exposure. The compositions of Examples 4-1 to 4-12 were no more yellow after 60 mines exposure at 175° C. than off-mill samples of controls 4-1 through 4-5.

EXAMPLE 5

To examine the effectiveness of anti-yellowing compositions of the invention in vinyl chloride polymer plastisol, tests were carried out according to the following formulation. Each compound was mixed and stirred until a homogeneous paste, deaerated for 1 hour at 5 mmHg, spread on a ferro type plate in 1 mm thickness, fused for 5 minutes at 190° C. to obtain test specimens with which oven heat stability test at 175° C., initial color test and heat coloring test after 30 minutes at 175° C. were carried out. The results are shown in Table-5.

TABLE - 5

| (FORMULATION) | |
|---|---|
| POLYVINYLCHLORIDE (Dispersion grade) | 100 parts by weight |
| DIOCTYLPHTHALATE | 80 |
| DIGLYCIDYL ETHER OF BISPHENOL A | 3.0 |
| Zn OCTOATE | 0.6 |
| Ba STEARATE | 0.2 |
| TETRA($C_{12-15}$ MIXED ALKYL) BISPHENOL A . DIPHOSPHITE | 1.0 |
| LD-2106 LIQUID BARIUM CARBONATE-BARIUM ALKYL PHENOLATE | 1.0 |
| 1,3-DIKETONES (TABLE 5) | 0.08 |

| No. | 1,3-Diketone Compounds | 175° C. Oven Heat Stability | HUNTER % YELLOWNESS INITIAL COLOR | HEAT COLOR 175° C./30 Min. |
|---|---|---|---|---|
| 5-1 | None | 45 | 23 | 48 |
| 5-2 | Octyl benzoylacetic acid ester | 45 | 18 | 33 |
| 5-3 | Ethyl acetoacetate Zn | 50 | 19 | 35 |
| 5-4 | None; 1.08 parts LD 2106 | 50 | 24 | 42 |
| 5-5 | Dibenzoylmethane 1.08 parts, without LD 2106 | 30 | 8 | — |
| EXAMPLE | | | | |
| 5-1 | Dehydroacetic acid | 75 | 9 | 12 |
| 5-2 | Dibenzoylmethane | 75 | 10 | 12 |
| 5-3 | Acetylbenzoylmethane | 70 | 10 | 14 |
| 5-4 | Acetyllauroylmethane | 65 | 11 | 15 |
| 5-5 | Dehydroacetic acid K | 70 | 11 | 13 |
| 5-6 | Dehydroacetic acid Zn | 75 | 10 | 12 |
| 5-7 | Dibenzoylmethane Mg | 70 | 11 | 13 |
| 5-8 | Dibenzoylmethane Zn | 75 | 10 | 13 |

The results of these tests demonstrate that stabilized plastisol compositions containing an anti-yellowing composition of this invention are greatly superior to control compositions lacking one of the required ingredients or containing instead a prior art betaketoester compound together with the same overbased barium compound.

EXAMPLE 6

With the anti-yellowing composition of this invention there can be incorporated a variety of other auxiliary additives and improved performance thereby obtained. In this example, tests were carried out in the same way as in Example-1 according to the following formulation. The results are shown in Table-6.

TABLE 6

| (FORMULATION) | |
|---|---|
| POLYVINYLCHLORIDE | 100 parts by weight |
| DIOCTYLPHTHALATE | 50 |
| Zn STEARATE | 0.5 |
| Ba STEARATE | 0.2 |
| STEARIC ACID | 0.3 |
| LD-2106 LIQUID BARIUM CARBONATE-BARIUM ALKYLPHENOLATE | 0.5 |
| DEHYDROACETIC ACID | 0.05 |
| ADDITIVE (Table - 6) | AS SHOWN |

| NO. | ADDITIVE | AMOUNT | 190° C. OVEN HEAT STABILITY Min. | HUNTER % YELLOWNESS INITIAL COLOR | HEAT COLOR 190° C./30 min. |
|---|---|---|---|---|---|
| CONTROL | | | | | |
| 6-1 | None(without dehydroacetic acid) | — | 40 | 35 | 66 |
| EXAMPLE | | | | | |
| 6-1 | None | — | 65 | 10 | 21 |
| 6-2 | Pentaerythritol | 0.2 | 80 | 8 | 16 |
| 6-3 | Dipentaerythritol | 0.2 | 80 | 7 | 14 |
| 6-4 | Sorbitol | 0.2 | 75 | 9 | 17 |
| 6-5 | 1,3,5-tris(2-hydroxyethyl)isocyanurate | 0.2 | 80 | 8 | 15 |
| 6-6 | Epoxidized polybutadiene | 0.5 | 85 | 9 | 17 |
| 6-7 | Epoxidized linseed oil | 0.5 | 90 | 8 | 15 |
| 6-8 | 1,3,5,-tris(2,3-epoxypropyl)isocyanurate | 0.5 | 90 | 8 | 15 |
| 6-9 | 2,6-di-t-butyl paracresol | 0.1 | 85 | 8 | 14 |
| 6-10 | Dilaurylthiodipropionate | 0.1 | 80 | 9 | 16 |
| 6-11 | Diphenylthiourea | 0.1 | 80 | 9 | 18 |
| 6-12 | 2-phenylindole | 0.1 | 85 | 9 | 16 |
| 6-13 | Thiodiethanol bis(aminocrotonate) | 0.1 | 95 | 9 | 16 |
| 6-14 | 2-dibutylamino-4,6-dithioltriazine | 0.1 | 90 | 7 | 13 |
| 6-15 | Triphenylphosphite | 0.3 | 85 | 8 | 13 |
| 6-16 | Diphenylphosphite | 0.3 | 85 | 7 | 12 |
| 6-17 | Monotridecyldiphenylphosphite | 0.3 | 95 | 7 | 12 |
| 6-18 | Tris(2,4-di-t-butylphenyl)phosphite | 0.3 | 90 | 7 | 13 |

As shown by the above results, the additional stabilizer compounds used in Examples 6-1 through 6-18 are effective in further improving the resistance to yellowing obtainable with a combination of 1,3-diketone compound and overbased metal compound in accordance with this invention.

We claim:

1. An anti-yellowing additive for minimizing the yellowing tendency when heated at 175° C. of environmentally acceptable stabilized vinyl chloride polymer composition from which arsenic, beryllium, cadmium, lead, mercury, and thallium are substantially excluded, comprising in combination (A) at least one overbased metal phenolate or sulfonate compound of at least one of the metals lithium, sodium, potassium, magnesium, calcium, strontium, and barium; and (B) for each part by weight of overbased metal compound 0.01 to 1 part by weight of a cyclic or open chain 1,3-diketone compound having 5 to 30 carbon atoms, or a lithium, sodium, potassium, magnesium, calcium, strontium, barium, zinc, aluminum, tin, or zinconium, salt thereof.

2. an anti-yellowing additive according to claim 1 in which the overbased metal compound is represented by the formula YnMe.xMe'A in which Y is the residue of an organic sulfonic acid or a phenol; n is 1 or 2, Me and Me' individually are litheium, barium, calcium, magnesium, potassium, sodium, or strontium, and x is a positive number, and A is a basic inorganic anion.

3. A homogeneous liquid anti-yellowing additive according to claim 2 in which in the overbased metal compound formula YnMe.xMe'A Y is the residue of an organic sulfonic acid having at least 20 carbon atoms or a phenol having at least 10 carbon atoms, Me and Me' individually are barium, calcium, magnesium, or strontium, x is a number from 1 to about 20, and A is carbonate.

4. An anti-yellowing additive according to claim 1 in which the overbased metal compound is an overbased petroleum sulfonate.

5. An anti-yellowing additive according to claim 1 in which the overbased metal compound is an overbased dialkylbenzene sulfonate.

6. An anti-yellowing additive according to claim 1 in which the over-based metal compound is an over-based barium carbonate-barium alkylphenolate.

7. An anti-yellowing additive according to claim 1 in which the over-based metal compound is an over-based clacium carbonate-calcium thiobis(alkylphenolate).

8. An anti-yellowing additive according to claim 1 in which the 1,3-diketone compound is free of metal.

9. An anti-yellowing additive according to claim 1 in which the 1,3-diketone compound is a zinc 1,3-diketone compound.

10. An anti-yellowing additive according to claim 1 in which the 1,3-diketone compound is an alkali metal diketone compound.

11. An anti-yellowing additive according to claim 1 in which the 1,3-diketone compound is an aliphatic 1,3-diketone compound.

12. An anti-yellowing additive according to claim 1 in which the 1,3-diketone compound is a lithium, sodium, potassium, magnesium, calcium, strontium, barium, zinc, aluminum, tin or zirconium compound of dibenzoylmethane.

13. An environmentally acceptable stabilized vinyl chloride polymer composition protected against yellowing and from which arsenic, beryllium, cadmium, lead, mercury, and thallium are substantially excluded, comprising a vinyl chloride polymer, a stabilizing amount of at least one heat stabilizer, and from 0.05 to 20 parts by weight per 100 parts by weight of vinyl chloride polymer of an anti-yellowing additive according to claim 1.

14. A vinyl chloride polymer composition according to claim 4 in which the vinyl chloride polymer is a homopolymer of vinyl chloride.

15. A vinyl chloride polymer composition according to claim 14 in which the vinyl chloride polymer is a copolymer of vinyl chloride and a comonomer selected from the group consisting of propylene, ethylene, 1-hexene, vinyl acetate, diethyl maleate, and diethyl fumarate.

16. A vinyl chloride polymer composition according to claim 14 in which the heat stabilizer is a barium, calcium, magnesium, or zinc salt of a non-nitrogenous monocarboxylic acid having 6 to 24 carbon atoms or a hydrocarbon-substituted phenol having 10 to 30 carbon atoms.

17. A vinyl chloride polymer composition according to claim 14 in which the heat stabilizer is an epoxidized triglyceride.

* * * * *